though intended, for various reasons, being omitted for clarity.

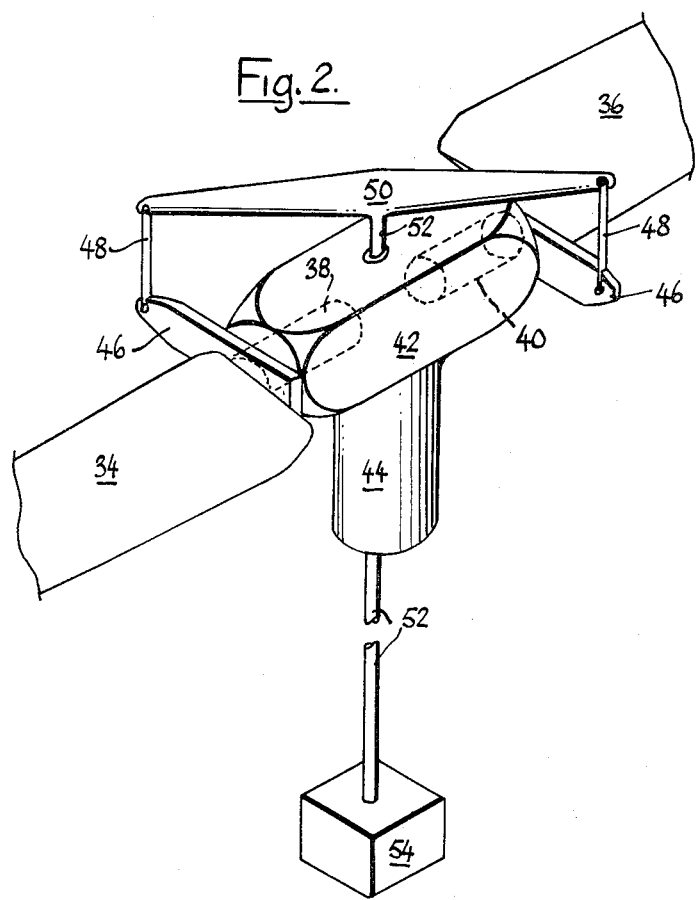

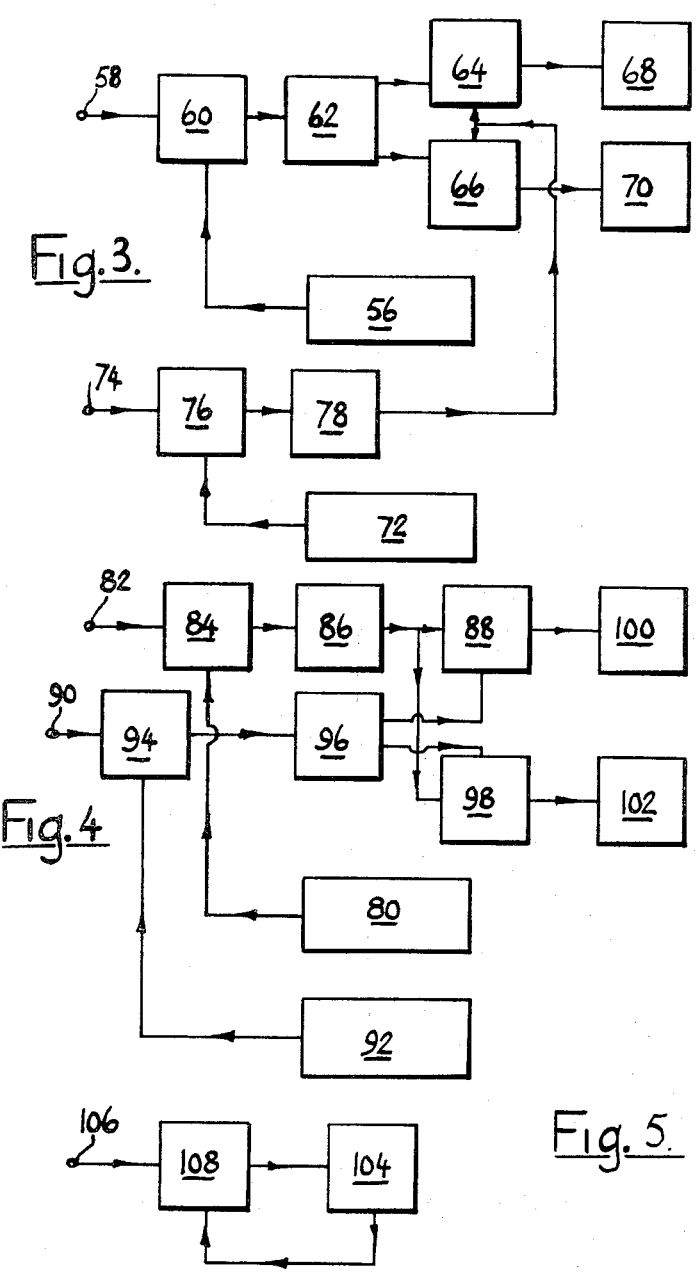

United States Patent Office 3,228,629
Patented Jan. 11, 1966

3,228,629
ROTARY WING AIRCRAFT HAVING AUTO-PILOTING MEANS
Kenneth Charles Garner, Bletchley, England, assignor to Ripper Robots Limited, Norfolk, England, a corporation of the United Kingdom
Filed Jan. 22, 1964, Ser. No. 344,159
3 Claims. (Cl. 244—17.13)

This invention relates to aircraft having auto-piloting means, with especial, but not exclusive, application to pilotless aircraft hereinafter referred to as "drone" aircraft.

Though the invention is believed to offer advantages of general application, a major aim of the invnetion is an aircraft equipped as a crop-spraying or -dusting "system," for which purpose it is desirable, for practical and commercial reasons, to use a simple and robust structure and to avoid as far as possible, the installation of elaborate and costly equipment.

For the purposes of the invention, a particular type of helicopter has been selected as the preferred aircraft, with a particular type of auto-pilot system installed therein.

An object of this invention is a helicopter comprising, in combination, at least one "rigid" lifting rotor, or ducted fan, which also serves as the sole effective means of horizontal propulsion, servo-operated flying control means and an auto-pilot system comprising a device capable of sensing and signalling quantitatively both linear accelerations and the component of gravity acting along a line normal to the rotor axis and means for receiving a "demand" signal and adding the same to the signal emitted by the sensing device to produce a total output signal, which is applied to the flying control operating servo means.

By a "rigid" rotor is meant in the present context, a rotor whose blades are so mounted as to sweep a disc whose plane, or a cone whose axis is substantially invariably orientated with respect to the airframe. (The qualification "substantially" as used above is introduced to include the case in which the swept disc or cone has a very limited and partially restrained freedom to tilt relatively to the airframe for a purpose hereinafter explained.)

A rigid rotor as above defined has no "flapping" or "see-saw" articulations, but the blades may be mounted on pure pitch-varying pivots and, subject however, to the qualifications stated in parenthesis the axis of the rotor shaft is fixed relatively to the airframe.

In a preferred form of construction the sensing device is a simple linear accelerometer, e.g. of the type, whose operative elements are a weight and a calibrated spring.

A preferred arrangement of the whole aircraft comprises two sensing devices responsive to linear accelerations and gravity components and acting respectively along mutually perpendicular lines.

Normally these lines will be the rolling and pitching axes of the aircraft, and the outputs of the two devices will be applied to the servo-means controlling the pitching and rolling controls respectively of the aircraft. However, an arrangement in which the respective accelerometers are disposed "quandrantally" with their lines of action at 45° to the pitching and rolling axes is possible; in which case, their outputs would be applied to the pitching and rolling controls, additively in one case and differentially in the other.

Such an arrangement as described above suffices for the stabilisation of the aircraft in pitch and roll and control of its horizontal motions in any azimuth responsively to the received demand signals. The latter could be generated internally of the aircraft by a human pilot, using, e.g., a miniaturized control lever operating transducing means in the auto-pilot system according to conventional practice but preferably, the demand signals are transmitted from a remote ground station, e.g. by radio means and received and transduced in the auto-pilot system.

For stabilisation and control of the aircraft in yaw the auto-pilot system may incorporate any suitable conventional means. Such means may be incorporated in the auto-pilot system itself, examples being devices utilising a free gyroscope, an integrated rate gyroscope, a doubly integrated accelerometer system or a combination of such instruments. Preferably, however, use is made of an external guidance system as described in patent specification No. 775,469 or in the specification of patent application No. 26,049/62, in which system the auto-pilot receives oscillatory signals from two remote transmitters, analyzes such signals and operates the aircraft's yawing controls so as to cause the aircraft to fly a course defined by the locus of points at which the two received signals have a constant phase-difference. For this purpose, the aircraft may be provided for example with two spaced antennae each connected to a separate receiver, whose output will be zero or have some constant value when its antenna is aligned on the required line of constant phase difference of the received signals; and the outputs of the two receivers are compared in the auto-pilot to produce an error signal which is so applied to the yaw-controlling channel of the auto-pilot as to cause the aircraft to take up a heading for which the outputs of both receivers are zero or have the same predetermined value.

The mechanical and aerodynamic elements of the servo-operated flying controls may be of any suitable conventional or known kinds; the choice of the most suitable methods will depend largely on the rotor configuration adopted.

Although, in its broadest aspect, the invention is applicable to a single rotor configuration, for various reasons twin or multi rotor configurations are considered more suitable.

The coaxial contrarotative configuration is possible but, side by side, or tandem twin rotors, with or without a third rotor, are preferred. Twin rotors with spaced axes may be either co-rotative or contrarotative; if desired, their axis may be "toed-in," i.e. mutually inclined inwardly and upwardly, to enhance inherent stability in roll or pitch as the case may be.

In the case of twin rotors with spaced axes, one preferred method of controlling the aircraft in pitch (for tandem rotors) or roll (for side by side rotors) is by differential collective pitch control of the rotors; an alternative method is by differential rotational speed control of the rotors, without pitch variation.

For controlling the aircraft in roll (for tandem rotors) or in pitch (for side by side rotors) a pair of angularly adjustable (non-rotary) aero-foil surfaces (flaps) situated in the rotor slipstreams may be used, such flaps also serving for control in yaw. Deflection of the flaps in the same sense will produce a rolling (or pitching) couple and differential deflection will produce a yawing couple.

By using more than one pair of such flaps, suitably orientated, control in pitch, roll and yaw can be obtained, without any other control means.

Another possible method of control in yaw of a helicopter with a tandem or side by side rotor configuration is by differential inclination of the swept discs (or cones) of the rotors, for which the rotor shafts or hubs must have a limited freedom to tilt (as previously mentioned) in the required azimuth.

Referring to the principal object of the invention as previously defined, our researches have indicated that, in a helicopter having a rigid rotor or rotors (or ducted fan(s)) in which horizontal propulsion is obtained by tilting the whole aircraft to produce a horizontal component of the rotor thrust vector, a linear accelerometer aligned in a direction normal to the rotor axis, e.g. the pitching or rolling axis of the aircraft, will respond unambiguously to the combined action of gravity (due to inclination of the accelerometer axis to the horizontal) and the linear acceleration along the accelerometer axis; provided the angle of tilt of the rotor axis to the vertical is small, and the heading of the aircraft (when moving horizontally) is substantially constant, in other words the aircraft does not execute banked or flat turns.

The means hitherto described serve to control the attitude of the aircraft in pitch, roll and yaw and its horizontal motion in any azimuth. For controlling the vertical motion of the aircraft, conventional or known means may be used, e.g. a sensitive altimeter or a device responsive to height above the ground transmitting signals, modified if necessary by demand signals from remote ground-based transmitter, to the appropriate flying controls.

By way of example only, an embodiment of the invention as first herein defined, and another embodiment of the invention are illustrated in the accompanying drawings of which:

FIG. 2 is a schematic view, in perspective, of a rigid lifting rotor, as incorporated in the helicopter of FIG. 1;

FIGS. 3, 4 and 5 are block diagrams of the "control loops" of the autopilot system for control in roll and height (altitude) (FIG. 3) pitch and yaw (FIG. 4) and engine control (FIG. 5) respectively.

Figure 1:
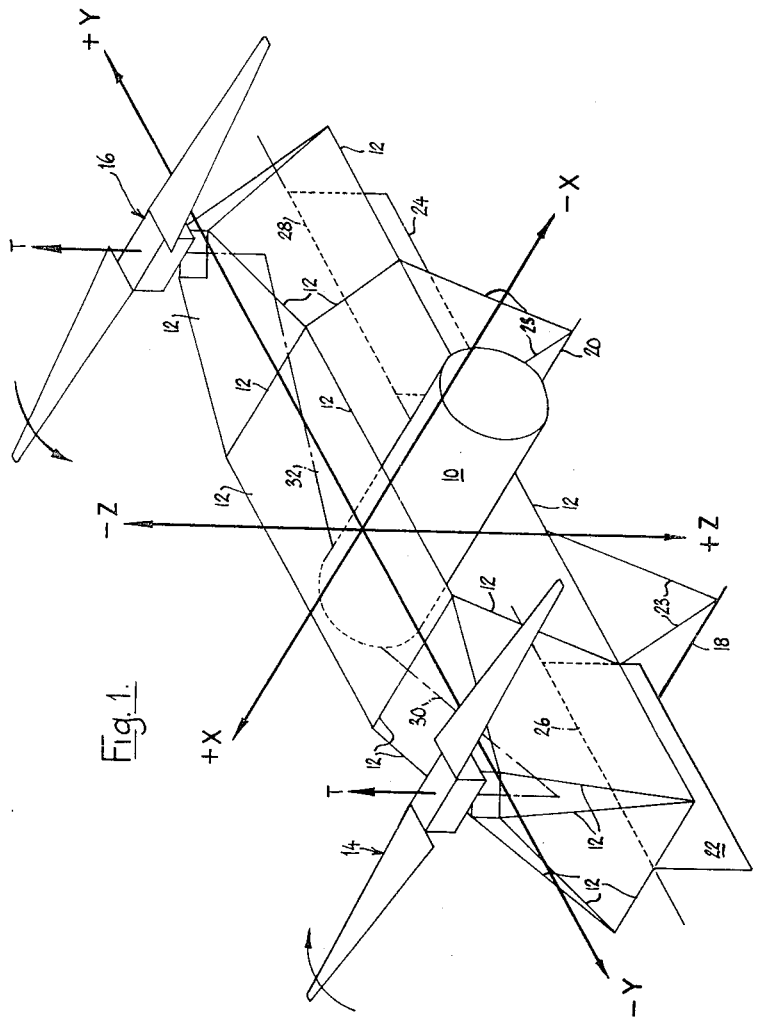
FIG. 1 is a schematic view, in perspective, of a drone helicopter with two side by side rigid lifting rotors.

Referring to FIGS. 1 and 2, the helicopter comprises a body 10 containing the engine and autopilot (not shown) a transverse framework 12, on the port and starboard extremities of which are mounted two-bladed rotors 14, 16. When on the ground, the helicopter is supported on two skids 18, 20 connected by struts 23 to the framework 12.

From either end of the framework 12 depend transversely aligned vertical flaps 22, 24 mounted on hinges 26, 28 and connected by linkages (not shown) to servo-actuators (also not shown) in the body.

The body axes of the helicopter are indicated by the lines +X—X (rolling) +Y—Y (pitching) and +Z—Z (yawing), the plus signs designating respectively forwards to starboard and downwards. Arrows T denote the rotor thrust vectors, coincident with the rotor axis. Chain dotted lines 30, 32, indicate conventionally the transmission shafts from the engine in the body to the rotors which contra-rotate as indicated by curved arrows.

Both rotors in this example are driven by a single engine, but a twin engine arrangement may be adopted if desired, either with each rotor driven by a separate engine or with both rotors coupled to both engines.

Each rotor (see FIG. 2) has two opposed blades 34, 36, mounted by means of feathering (pitch varying) pivots 38, 40, in a hub, 42, which is integral with a hollow drive shaft 44. The latter is supported in the framework 12 by thrust and radial bearings (not shown) without freedom to tilt. The blade roots carry pitch levers 46, connected by links 48, to a cross bar 50, rigidly attached to a control rod 52, slidable coaxially within the shaft 44. Up and down movement of rod 52 varies the collective pitch of the rotor, no provision being made for cyclic pitch control. The servo-actuator for rod 52 is not illustrated, but its housing is conventionally indicated by the box 54.

In the helicopter illustrated in FIGS. 1 and 2 control in the pitch, which also controls fore and aft horizontal speed (by tilting the thrust vectors in the pitching plane XZ) is effected by conjoint deflection of the flaps 22, 24, which lie in the rotor slip streams, forwards or rearwards; control in yaw by differential deflection of flaps 22, 24, and control in roll, which also controls sideways speed (by tilting the thrust vectors in the rolling plane YZ) by differential collective pitch variation of the rotors. Control of vertical speed (height control) is by varying the collective pitch of both rotors in the same sense.

The constructional and electrical details of the autopilot system are not illustrated, but it is to be understood that they comprise electrical-electronic circuits receiving signals from simple linear accelerometers aligned on the X and Y axes of the aircraft, a heading-responsive device in the autopilot system or/and an externally guidance system as previously mentioned, an engine governor and command signals transmitted from a remote ground station, and producing outputs applied to the servo-actuators of the collective pitch control rods 52, of the flaps 22, 24, and of the engine controls, as shown in the control loops illustrated in FIGS. 3, 4, and 5.

FIG. 3 represents the control loop for the collective pitch controls of the rotors. The output of a linear accelerometer 56 aligned on the Y axis of the helicopter is fed, together with a sideways horizontal velocity command signal, received at 58, to a summing network 60, whose output is fed to a double-sided amplifier 62.

The two outputs of amplifier 62 are transferred to summing networks 64, 66, respectively, whose outputs, further amplified in amplifiers 68, 70, are applied to the servo-actuators of the rods 52 (FIG. 2) controlling the collective pitches of the port and starboard rotors. In addition, the output of a height-responsive device 72 (sensitive altimeter or a device detecting vertical distance from the ground), together with a height command signal received at 74 are fed to a summing network 76, whose output, amplified in a single-sided amplifier 78, is fed to both the summing networks 64, 66. The arrangement is such that the outputs from amplifier 62 cause the port and starboard collective pitch controls to be actuated in opposite senses, while that from amplifier 78 causes both collective pitch controls to be actuated in the same sense.

FIG. 4 represents the control loop for the flaps 22, 24 (FIG. 1). The output of a linear accelerometer 80, aligned on the helicopter's X axis, and a fore and aft horizontal velocity demand signal, received at 82, are combined in a summing network 84; and the output of a yaw attitude detecting device or guidance system 92 is combined with a heading command signal received at 90, in a summing network 94. The output of summing network 84 is fed through a single sided amplifier 86 to summing networks 88, 98. The output of summing network 94 is fed to a double-sided amplifier 96, whose two outputs are fed to the summing networks 88, 98, respectively. The outputs of the latter, further amplified in amplifiers 100, 102, are applied, respectively, to the servo-actuators of the port and starboard flaps 22, 24 (FIG. 1). The output of amplifier 86 is operative to deflect both flaps in the same sense, while the two outputs of amplifier 96 are operative to deflect the flaps in opposite senses.

FIG. 5 represents the engine control loop, in which the output signal of an engine speed governor 104 and an r.p.m. command signal, received at 106, are fed to a summing network 108, whose output is fed back to governor 104.

All demand signals are datum varying signals, which operate through the summing networks to vary the values of horizontal speeds, height, heading and engine revolutions at which the error signals emitted by amplifiers 62, 78, 86, 96, and the governor 104 respectively, become zero.

What I claim is:

1. A free-flying, pilotless helicopter comprising, in combination: an airframe, two spaced and side by side lifting rotors on said airframe, aerodynamic means controlling the attitude of the airframe, said aerodynamic means including means for differentially varying the collective pitches of said rotors and having hinged flap means disposed in the slip stream of each of said rotors, said flap means being suspended parallel to the pitching axis of the airframe, means for varying the angular adjustment of said hinged flap means, each of said rotors including a driven hub having a vertical axis, radially extending blades mounted on said hub, said blades being arranged to sweep a constant path relatively to said axis; an autopilot system, said autopilot system including two linear accelerometers, said accelerometers being sensitive to, and emitting outputs representing the resultants of, the linear acceleration of the airframe and the component of gravity acting along one and the other respectively of two angularly spaced lines normal to the rotor axis and fixed in the airframe, said autopilot system including means for receiving remotely generated command signals and emitting outputs representing a horizontal velocity of selected speed in a selected azimuth of the airframe, and means for summing and resolving all said outputs and applying their resultants to said aerodynamic means whereby the attitude of said airframe is arranged to locate said angularly spaced lines inclined to the horizontal to produce a horizontal velocity of the selected speed in the selected azimuth.

2. An improvement for measuring the horizontal airspeed of a free-flying helicopter comprising the combination of at least one, sustaining and propulsive rotor, said rotor having a rotational axis member and radially extending blades mounted on said axis member, said blades being disposed to sweep a path the attitude of which relative to the rotational axis is constant, said rotor constituting the sole means of horizontal propulsion of the helicopter by inclination of its rotational axis from the true vertical, and a linear accelerometer fixed relatively to said rotational axis, said accelerometer having its direction of sensitivity disposed substantially normal to said rotational axis, whereby the output of said accelerometer measures the horizontal airspeed of the helicopter in the azimuth of said direction of sensitivity.

3. A free flying pilotless helicopter comprising, in combination: an airframe, at least one lifting and propulsive rigid rotor system, aerodynamic means controlling the attitude of the airframe, an autopilot system, said rotor system including a driven hub having a generally vertical axis, said rotor system comprising the sole means of horizontal propulsion by inclination of said axis from the true vertical, radially extending blades mounted on said hub and arranged to sweep a constant path relatively to said axis, said autopilot system including a linear accelerometer sensitive to, and emitting an output representing the resultant of linear acceleration of said airframe, the component of gravity acting along a line normal to said vertical axis, said accelerometer being fixed relative to said vertical axis and having its direction of sensitivity disposed substantially normal to said axis, said autopilot system including additional means for receiving a remotely generated command signal and emitting an output representing a selected horizontal velocity of the airframe, and means for summing the said outputs and applying their resultant to said aerodynamic means whereby the attitude of the airframe is determined and said line normal to the rotor axis is appropriately inclined to the horizontal to produce the said selected horizontal velocity in the azimuth of said line.

References Cited by the Examiner
UNITED STATES PATENTS

| | | | |
|---|---|---|---|
| 2,886,261 | 5/1959 | Robert et al. | 244—17.25 |
| 3,053,480 | 9/1962 | Vanderlip | 244—17.13 |
| 3,053,485 | 9/1962 | Brunbaker | 244—77 |
| 3,071,335 | 1/1963 | Carter | 244—17.13 X |
| 3,096,046 | 7/1963 | Kendall et al. | 244—17.13 |
| 3,101,919 | 8/1963 | Madon | 244—17.17 X |
| 3,103,327 | 9/1963 | Parry | 244—17.19 X |
| 3,118,504 | 1/1964 | Cresap | 244—17.25 X |

MILTON BUCHLER, *Primary Examiner.*

FERGUS S. MIDDLETON, *Examiner.*

G. P. EDGELL, *Assistant Examiner.*